Patented Nov. 19, 1946

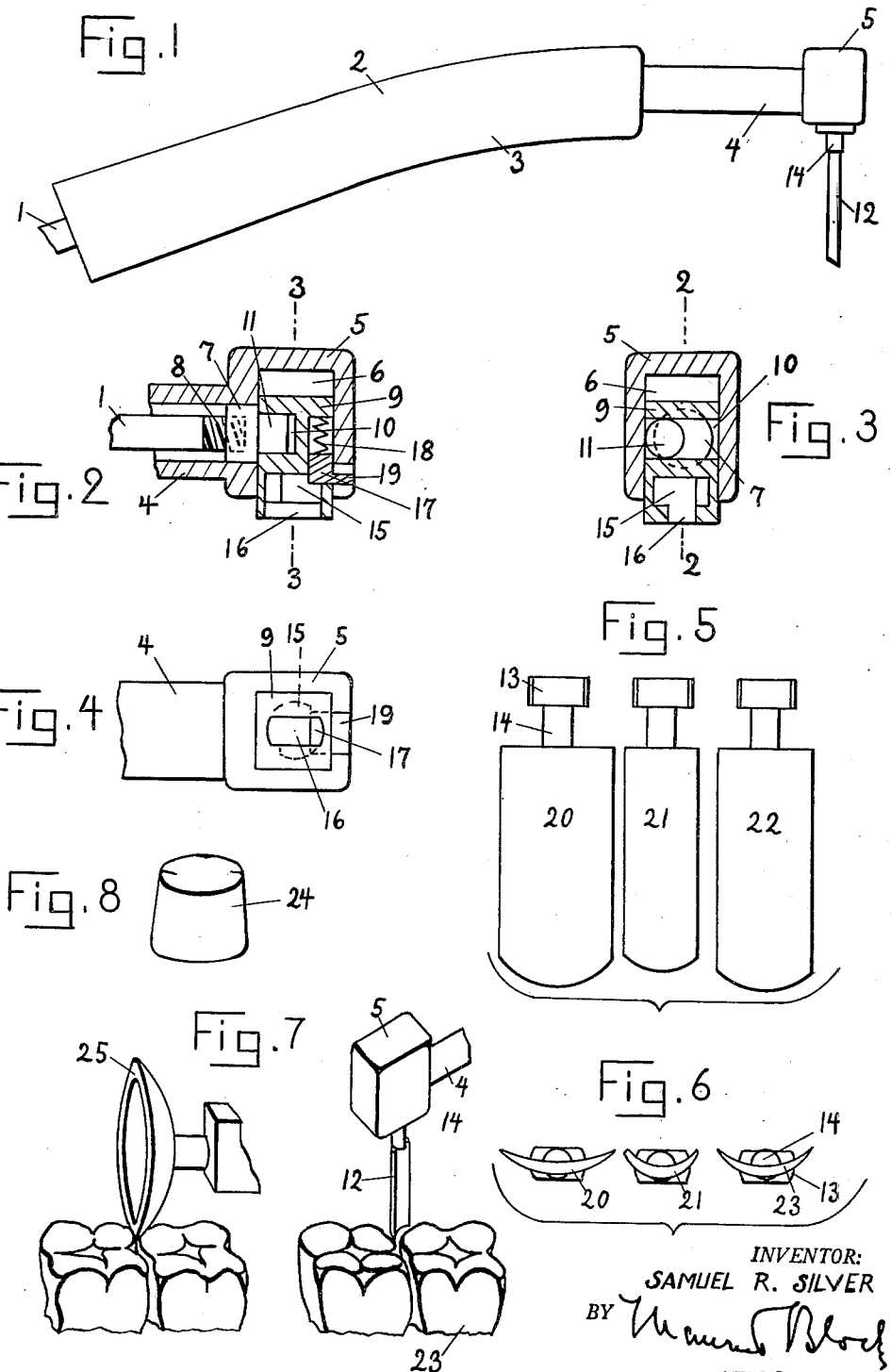

2,411,234

UNITED STATES PATENT OFFICE 2,411,234

APPARATUS FOR GRINDING TEETH

Samuel R. Silver, Brooklyn, N. Y.

Application November 22, 1944, Serial No. 564,569

2 Claims. (Cl. 32—26)

My invention relates to the art of grinding teeth, a particular branch of dental surgery.

Objects of my invention are to grind the surfaces of teeth, especially the lingual, buccal, mesial and distal surfaces, to remove undercuts, projections or discolored or otherwise objectionable superficial layers, and to prepare the shape of teeth for crown and bridge work, including jacket crowns and three quarter crowns.

Other objects are porte polishing and cleaning of teeth.

Particular objects of my invention are to facilitate and simplify all these operations, and to increase their precision, speed and efficiency.

Further objects are to make possible or to facilitate the avoidance of any damage or harm to neighboring teeth or to any other parts of the mouth during these operations.

Still further objects and advantages will appear from the following description of my method and of exemplifying embodiments of means used for this method, from the appended claims, and from the accompanying drawing in which:

Fig. 1 shows a side elevation of a tool adapted for the inventive use.

Fig. 2 shows a cross-section through the head portion of this tool, said cross-section being taken along the line 2—2 in Fig. 3.

Fig. 3 shows a cross-section of the same head portion, taken along the line 3—3 in Fig. 2 and seen from the right side in Fig. 2.

Fig. 4 shows a view of the same head portion, seen from the lower side in Fig. 2.

Fig. 5 shows side elevations of three different grinding tools or cutters belonging to a set of interchangeable or alternatingly used cutters.

Fig. 6 shows the same cutters seen from the lower side in Fig. 5.

Fig. 7 shows the inventive method applied to an exemplifying case and compared with the prevailing old method, the left side of this figure showing the use of a rotary cutter and the right side showing the use of a reciprocating cutter according to the invention.

Fig. 8 shows the natural crown of a tooth having a shape prepared for an artificial crown.

All figures are represented on an enlarged scale, the scale of Figs. 2, 3, 4, 5 and 6 being still larger than the scale of Figs. 1, 7 and 8.

According to my invention, teeth are ground by a motoric movement which is reciprocating in contradistinction from the known method of motoric grinding teeth by a rotary movement. The motoric movement may be derived from any suitable and known motor which may drive, for example, a flexible shaft or axle in well known manner.

Referring to the drawing, numeral I indicates such a shaft rotated by motoric means. The latter means are not shown and may be affixed to the shaft I at that end which is shown broken off, in any known and suitable manner. The opposite end of the shaft I enters the tubular tool holder 2 which may comprise a slightly curved part 3, a narrower neck 4 and a head portion 5. The tubular channel of the holder 2 extends through the parts 3 and 4 and terminates in a circular opening connecting this channel with a space 6 provided in the head portion 5. A disk or short shaft 7 is positioned in this opening near the space 6. The shaft I is connected to this disk in any suitable manner, for example by a thread 8 provided at the end of the shaft I and screwed into the disk 7 in the direction of the motoric rotation so that rotation of the shaft I will not unscrew the thread 8.

The space 6 contains a reciprocating member or slide 9 projecting through an opening of the space at the lower side (Figs. 1 and 3) thereof. The slide 9 has a cross-section parallel to the opening, fitting the cross-section of the space 6, and is slidable in this space in a direction to and from this opening. A groove 10 is cut across the sliding direction in the slide 9 and has an open side adjacent to the disk 7. A cylindrical extension or pin II is excentrically affixed to the disk 7, may form an integral part thereof, and is positioned in the groove 10, contacting two opposite walls of the groove. When the pin rotates around the axis of the disk 7, the pin II causes the slide 3 to move reciprocatingly in the space 6.

A reciprocating grinding tool or cutter may be affixed to the slide 9 in any suitable manner, for example by the followingly described structure: A cutter 12 has an end shaped about like a hammer and comprising a head or cross-beam 13 affixed to a round neck or stem 14. The slide 9 has a cavity for the reception of this end. This cavity comprises a space 15 having a shape permitting the hammer head 13 to turn, and an opening 16 fitting this head. When the hammer-shaped end has been inserted into this cavity, the head 13 having passed through the opening 16 and the neck 14 extending through this opening, the cutter 12 is turned, for example about 90 degrees, whereafter the cutter can not be withdrawn from the slide 9.

In this turned position, the cutter may be secured by any suitable means, for example by frictional engagement of the head 13 with the walls of the space 15, or, preferably, by a locking member 17 slidably inserted in the slide 9 and urged by a spring 18 into a position where the member 17 enters the space 15 aside of the head 13 and prevents the latter from further turning movement. During the insertion of the cutter, the head 13 presses the member 17 against the pressure of the spring 18 out of the space 15 into a recess of the slide 9 wherefrom the member emerges when the cutter has been turned. The member 17 has an integral extension 19 which is accessible from the outside and by means of which the tip of a finger can press the member 17 out of the interlocking position whereupon the head 13 can be turned back into a position which is in line with the opening 16 and permits withdrawal of the cutter from the sled.

A set of cutters having identical heads 13 and necks 14 may be provided and may comprise cutters having blades of different shapes and sizes affixed to the necks 14, for example blades 20, 21 and 22. The individual cutters may be exchanged and used alternatingly, such blade being selected from the set as is best fit for the present work conditions. The adaptations of the tool to these conditions can be still more varied by inserting, securing and using each cutter in one of several positions. For example, the shown and described structure permits to insert and to secure the cutter in two positions which are turned relatively to each other about 180 degrees.

The blades may have any suitable shape and may be made from any suitable material. Preferably, the blades have cylindrically curved surfaces or crescent-shaped cross-sections, are made of thin steel and are covered with diamond dust. Or the blades may be covered with emery or an emery mixture, or the material of the blades may be a mixture of a grinding agent with a firm binding agent.

After a suitable cutter has been attached to the slide 9 and the shaft 1 has been connected to the motor, the dentist directs the holder 2 into a position where the cutter, moving reciprocatingly, contacts the surface of the tooth to be ground. For example, the cutter may be brought into the position shown on the right side of Fig. 7 where the cutter is supposed to start grinding the tooth 23. It is obvious that the reciprocating cutter can easily and precisely perform the operations which are objects of this invention, for example, the operation of grinding the tooth 23 into a shape 24 having straight, conically tapering side lines without undercuts, as crown work requires.

In comparison thereto, the rotary cutter 25, a usual form of which is shown on the left side of Fig. 7, is much less suitable for these operations. With a rotary tool, the dentist can produce straight side lines or conical surfaces like that shown in Fig. 8 only with great difficulty, has to apply utmost care and skill and must spend much more time on the work whereby the suffering of the patient is increased. While the reciprocating tool may have only one relatively large extension in the reciprocating direction, the rotary movement requires a relatively broad cutter which is less adapted to comply with the narrow spaces in the mouth and between the teeth whereby the rotary movement endangers the parts of the mouth and the teeth positioned in the neighborhood of the treated tooth. The disadvantages of the rotary movement are further increased by the fact that this movement involves a grinding action in many different directions whereby this action can be hardly restricted to the desired direction as can be easily done in the case of reciprocating movement.

I desire it understood that my invention is not confined to the particular embodiments and uses shown and described, the same being merely illustrative, and that my invention may be carried out in other ways without departing from the spirit of the invention as it is obvious that the particular embodiments and uses shown and described are only a few of the many that may be employed to attain the objects of my invention.

Having described the nature of my invention and how it operates, what I claim and desire to secure by Letters Patent is:

1. An instrument for grinding teeth comprising a tubular shaft casing, a head at the front end of said casing open at its lower end and having a rear wall formed with an opening registering with the casing, a block in said head slidable longitudinally therein through the open lower end thereof and having its lower end portion formed with a socket having a restricted entrance slot leading from the lower end face of the block, the rear portion of the block being formed with a transverse slot, a shaft rotatably mounted in said head, a disk carried by the front end of said shaft and having an eccentrically mounted pin extending forwardly therefrom in the head and engaged in the transverse slot to reciprocate the block longitudinally during rotation of the shaft and disk, said block having a groove at its front extending rearwardly from said socket, and having its lower portion communicating with a slot leading from the lower end of the front of the head, a latch slidable in the groove and having an actuating member extending forwardly through the slot at the front of the head, and a spring in the groove of said block urging the latch downwardly and yieldably holding it at the lower end of the groove with a portion extending into the socket, whereby a tool may be thrust into the socket and held against outward displacement by the latch.

2. An instrument for grinding teeth comprising a hollow head open at its lower end and having a wall formed with a slot leading from the lower end, a block slidable longitudinally in said head through the lower end thereof and formed with a tool-receiving socket having an entrance slot leading from the lower end of the block, whereby a headed shank of a tool may be thrust into the socket and turned to a position disposing its head in crossed relation to the entrance slot, said block being formed with a longitudinal groove leading from the socket and having its lower portion overlapped by the slot in the wall of the head, a latch slidable longitudinally in the groove and having a lug projecting outwardly through the slot in the head and means for reciprocating the block in the head.

SAMUEL R. SILVER.